US008892389B1

(12) United States Patent
Muller et al.

(10) Patent No.: US 8,892,389 B1
(45) Date of Patent: Nov. 18, 2014

(54) DETERMINING A CONDITION OF A SYSTEM BASED ON PLURAL MEASUREMENTS

(75) Inventors: P. Keith Muller, San Diego, CA (US); David G. Wang, San Diego, CA (US)

(73) Assignee: Teradata US, Inc., Dayton, OH (US)

(*) Notice: Subject to any disclaimer, the term of this patent is extended or adjusted under 35 U.S.C. 154(b) by 1781 days.

(21) Appl. No.: 12/058,895

(22) Filed: Mar. 31, 2008

(51) Int. Cl.
*G01K 5/66* (2006.01)
*G06F 11/00* (2006.01)
*G06F 15/00* (2006.01)
*G06F 11/30* (2006.01)

(52) U.S. Cl.
CPC ........ *G06F 11/3003* (2013.01); *G06F 11/3058* (2013.01)
USPC ............ 702/130; 361/690; 702/104; 702/185

(58) Field of Classification Search
CPC ............ G06F 11/3003; G06F 11/3055; G06F 11/3058; G06F 11/3065; G06F 11/3447; G06F 11/3452; G06F 11/3466; H02P 8/36
USPC ........... 702/99, 104, 130, 132, 136, 184, 185; 361/690; 714/48
See application file for complete search history.

(56) References Cited

U.S. PATENT DOCUMENTS

2007/0115630 A1* 5/2007 Midgley ........................ 361/690

* cited by examiner

*Primary Examiner* — John H Le
(74) *Attorney, Agent, or Firm* — Trop, Pruner & Hu, P.C.

(57) ABSTRACT

To determine a system condition, temperature information from at least one temperature sensor in the system is received, along with second information from at least a second type of sensor in the system. An out-of-range temperature condition is detected according to the received temperature information. According to the second information, one of plural potential causes of the out-of-range temperature condition is selected.

20 Claims, 8 Drawing Sheets

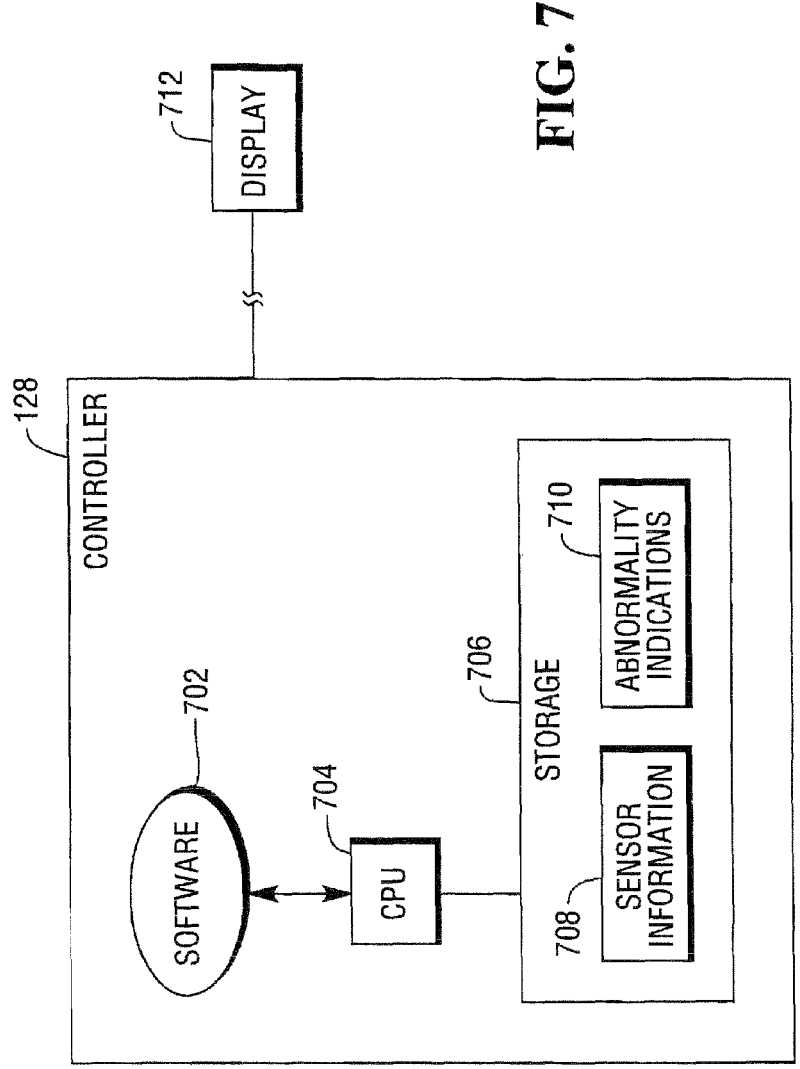

DETERMINING A CONDITION OF A SYSTEM BASED ON PLURAL MEASUREMENTS

BACKGROUND

A system, such as a computer system or other type of system, includes various active components, including processing components, storage components, communications components, and so forth. Such active components draw electrical power to perform their respective tasks, and convert electrical power into thermal energy (in the form of heat) in the process. To prevent overheating, most systems include some type of a cooling mechanism, such as a fan (or multiple fans), to move air across heat-generating components to remove heat generated by such heat-generating components to maintain temperatures below some allowed maximum for proper performance and reliability.

Temperature sensors can be placed at different locations in a system. If a temperature in any part of the system rises above some threshold, then alerts or warnings can be generated, or system shutdown can be effected.

There may be various different causes of excessive temperature conditions. A simple warning provided of a high temperature level may not give a user any explanation of the root cause of such high temperature condition. Therefore, troubleshooting to find the cause of the high temperature condition can be difficult and time-consuming. As a result, high temperature conditions may cause shutdown of mission-critical systems for a relatively long period of time while troubleshooting occurs.

SUMMARY

In general, a technique or mechanism is provided to monitor at least one temperature of a system along with at least one other parameter of the system. Using the monitored temperature and the at least one other measured parameter, a cause of an out-of-range temperature condition can be more accurately determined.

Other or alternative features will become apparent from the following description, from the drawings, and from the claims.

BRIEF DESCRIPTION OF THE DRAWINGS

FIG. 7 is a block diagram of a controller according to an embodiment.

DETAILED DESCRIPTION

In the following description, numerous details are set forth to provide an understanding of the present invention. However, it will be understood by those skilled in the art that the present invention may be practiced without these details and that numerous variations or modifications from the described embodiments are possible.

Figure 1A:
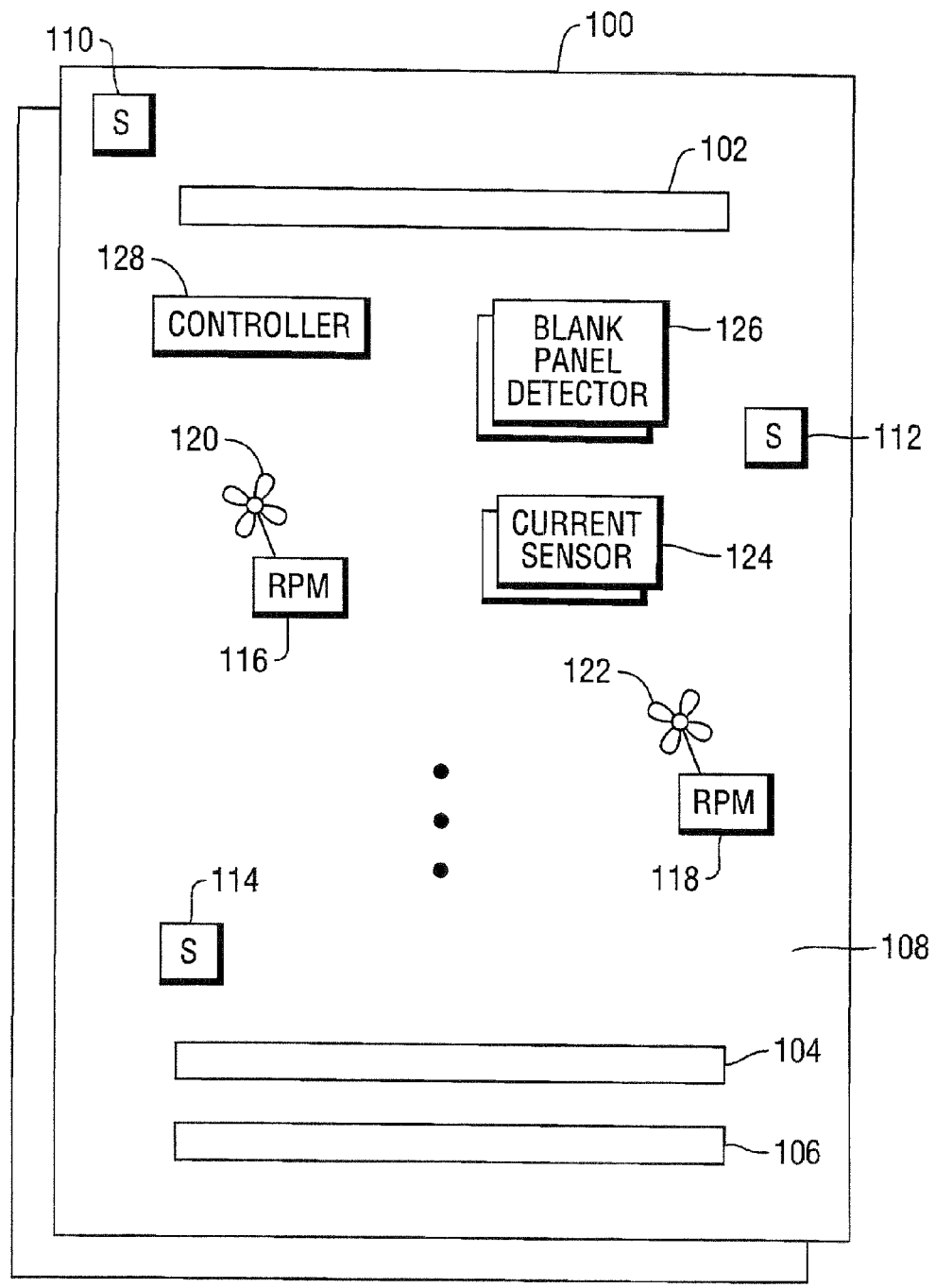
FIG. 1A illustrates an example system having heat-generating active components for performing various tasks, and a controller to determine a cause of an out-of-range temperature condition based on multiple measured parameters, in accordance with an embodiment.

FIG. 1A illustrates an example system 100 that has various active components 102, 104, 106, for performing various tasks of the system 100. The active components 102, 104 and 106 can be processing components, storage components, communications components, and/or other components. The system 100 can be a computer system, storage system, communications system, and so forth. During operation, the active components 102, 104, and 106 may generate heat that can increase temperature of these components and temperature inside an inner space 108 of the system 100.

In one example, the system 100 can be a cabinet having one or more chassis in which can be provided various components. Multiple systems 100 are depicted in FIG. 1A, where each of the systems 100 has a corresponding cabinet.

Figure 1B:
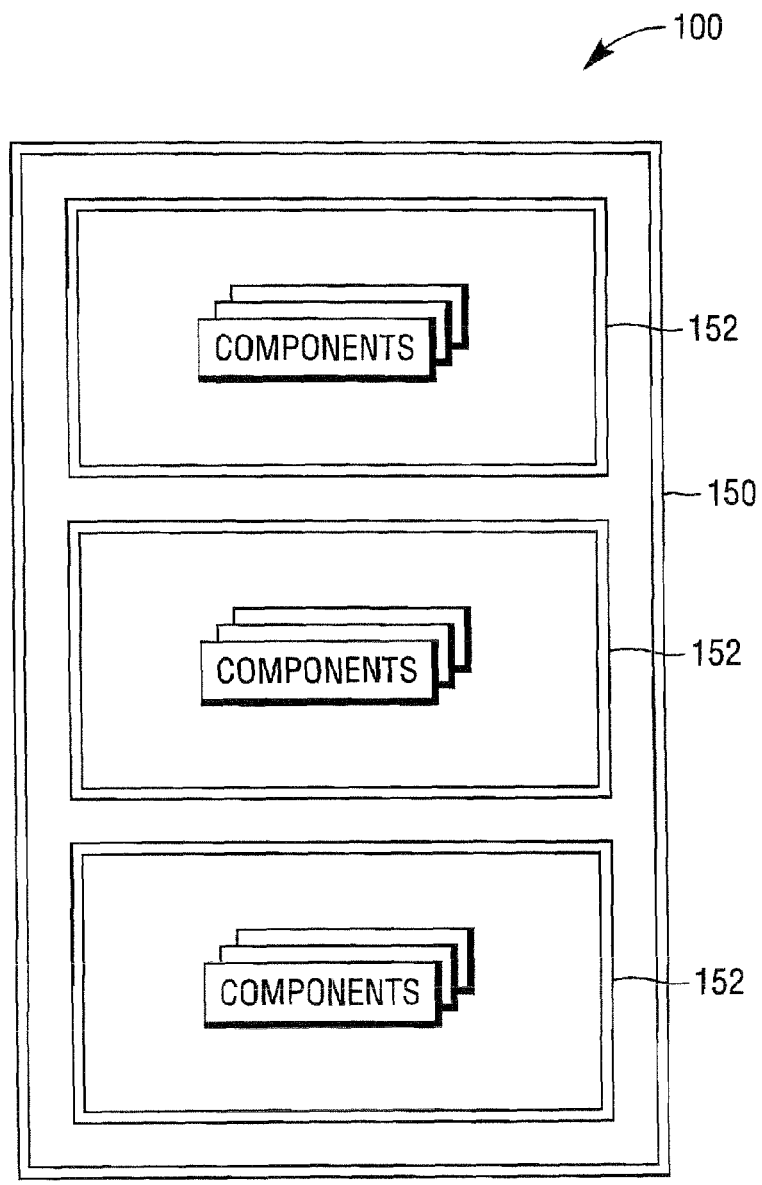
FIG. 1B illustrates an example system that includes a cabinet with multiple chassis, according to an example implementation.

FIG. 1B shows an example cabinet 150 of a system 100 that contains multiple chassis 152. The cabinet 150 provides the outermost housing of the system 100, whereas the chassis 152 inside the cabinet 150 provide sub-frames inside the cabinet 150. Each chassis 152 contains a corresponding group of components, including active components, sensors, cooling devices, and so forth. In a different embodiment, a cabinet 150 is made up of just one chassis, instead of multiple chassis.

As depicted in FIG. 1A, several temperature sensors 110, 112, and 114 can be provided in various parts of the inner space 108 inside the system 100. The sensors can also be part of or coupled to components 102, 104, or 106. Although three temperature sensors are depicted, it is noted that in different implementations, different numbers of temperature sensors can be used. Also, although reference is made to "space 108" in the singular sense, note that the space 108 can actually refer to multiple discrete regions, such as those defined by multiple chassis 152 (FIG. 1B).

There are also various other types of sensors in the system 100, including RPM (revolution per minute) sensors 116 and 118 coupled to respective airflow generators (e.g., fans) 120, 122. More generally, the sensors 116 and 118 are used to measure rotational speeds of the airflow generators 120 and 122. Again, although two airflow generators and two corresponding RPM sensors are depicted, it is noted that different numbers of airflow generators and associated RPM sensors can be used. The airflow generators 120, 122 are used to induce airflows inside the inner space 108 to enable removal of heat from the active components of the system 100. Instead of using airflow generators, other types of cooling devices can be used in other embodiments.

Other sensors that are present in the system 100 include electrical current or power consumption draw sensors 124 (to measure electrical current or power drawn by one or more active components of the system 100). Note that one corresponding current sensor can be provided per active component 102, 104, or 106, or alternatively, one current sensor can be provided for some group of active components.

The system 100 also includes blank-panel detectors 126 to detect whether blank panels have been installed in the system 100. In a system that is not fully loaded with components, there can be blank spaces. In some cases, it may be undesirable to allow air to flow through such blank spaces, which may interfere with cooling of other portions of the system 100. As a result, a blank panel can be installed in such a blank space to enable proper cooling operation of the system 100. Each blank panel detector 126 is able to detect whether the blank panel has been installed or not in a corresponding region of the system 100.

Although various example sensors are illustrated in FIG. 1A, it is noted that in other embodiments, other types of sensors can alternatively or additionally be used.

FIG. 1A also illustrates a controller 128 in the system 100. The controller 128 is able to receive information from the various sensors of the system 100, including sensors 110, 112, 114, 116, 118, 124, and 126. The connections of the sensors to the controller 128 are not depicted in FIG. 1 for purposes of clarity.

The controller 128 can collect measurement information from various sensors to detect if any abnormalities are present in the system 100. For example, one abnormality can be a temperature out-of-range (or abnormal temperature) condition (e.g., high temperature condition, where temperature is greater than a predefined threshold). For example, the temperature(s) detected by one or more temperature sensors 110, 112, and 114 can indicate that respective component(s) or portion(s) of the system 100 is (are) overheating. In response to detecting a temperature out-of-range condition, the controller 128 can then use information from one or more of the other sensors (e.g., RPM sensors 116, 118, current sensors 124, and/or blank panel detectors 126) to make a more informed decision regarding a cause (or causes) of the temperature out-of-range condition. By considering multiple parameters, the controller 128 can more accurately determine the cause (or causes) of temperature abnormalities within the system 100. This enables an operator or user to more quickly troubleshoot malfunctions, faults, or other problems associated with the system 100, and to perform the appropriate repair or other actions to address such issues.

Although the controller 128 is depicted as being inside the inner space 108 of the system 100, it is noted that the controller 128 can alternatively be separate from the system 100. For example, the controller 128 can be a remote controller that is coupled to the system 100 over a data network. Such a remote controller can be in the form of a computer, handheld device, and so forth.

The controller 128 can include software executable to receive information from the various sensors of the system 100, and to perform processing of such information to determine if abnormalities are present and to identify the cause(s) of such abnormalities.

Also, the controller 128 may also be able to receive measurements from sensors of other systems 100. As discussed further below, measurements from sensors of multiple systems 100 can be considered together for identifying a root cause of an abnormality such as a temperature out-of-range condition.

Figure 2:
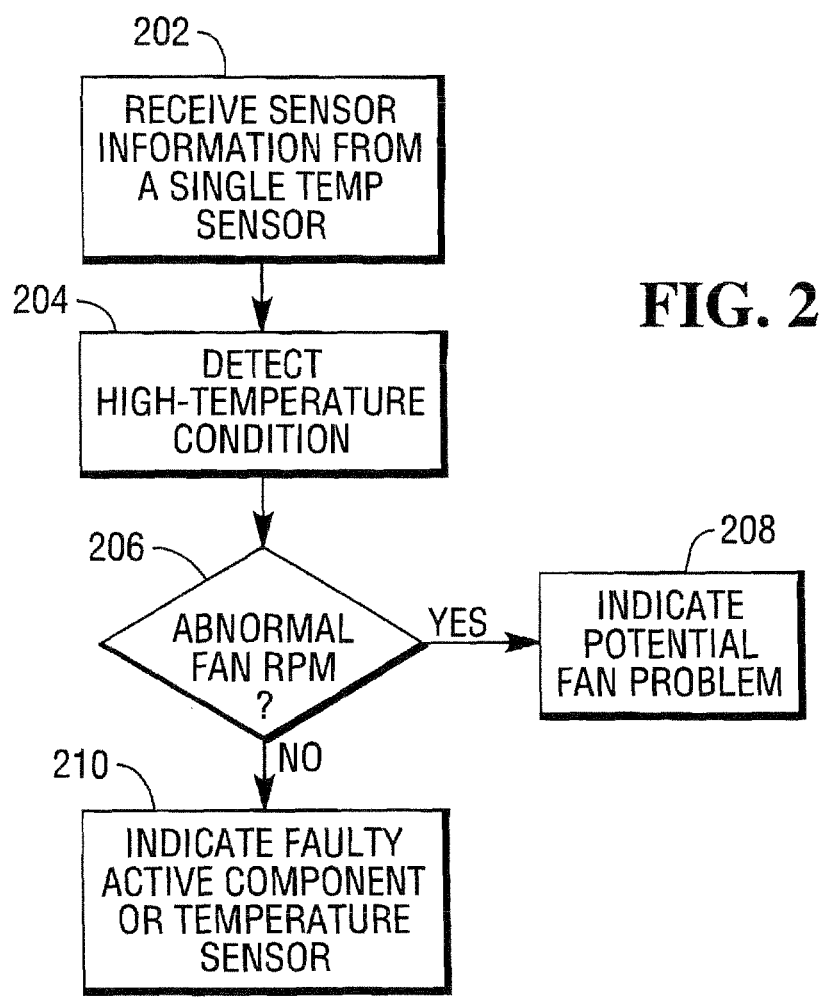
FIGS. 2-5 are flow diagrams of processes of determining causes of temperature abnormalities in the system, according to some embodiments.

FIG. 2 shows a flow diagram of a process according to an embodiment for determining a cause of a high-temperature condition detected by a single temperature sensor. The controller 128 receives (at 202) information from the single temperature sensor. Based on the received sensor information from the single temperature sensor, the controller detects (at 204) that a high-temperature condition is present (temperature exceeding a predefined threshold) on a corresponding component or in a corresponding part of the system 100 being monitored by the temperature sensor.

In response to detecting such a high-temperature condition, the controller checks (at 206) for abnormal fan RPM (based on information from an RPM sensor 116 or 118). Abnormal fan RPM refers to a rotational speed of a fan being above or below expected speeds. If abnormal fan RPM is detected (e.g., the fan RPM is less than an expected amount), then the controller can indicate (at 208) a potential fan problem. An operator can then receive this indication and proceed to monitor, investigate and/or replace the fan that is believed to be faulty.

However, if the determination at 206 indicates that the fan RPM is not abnormal, then the controller can indicate (at 210) that either an active component (or active components) or the temperature sensor is faulty. The operator can then monitor and investigate the corresponding active component(s) or temperature sensor to determine whether any repairs or replacement should be performed.

Figure 3:
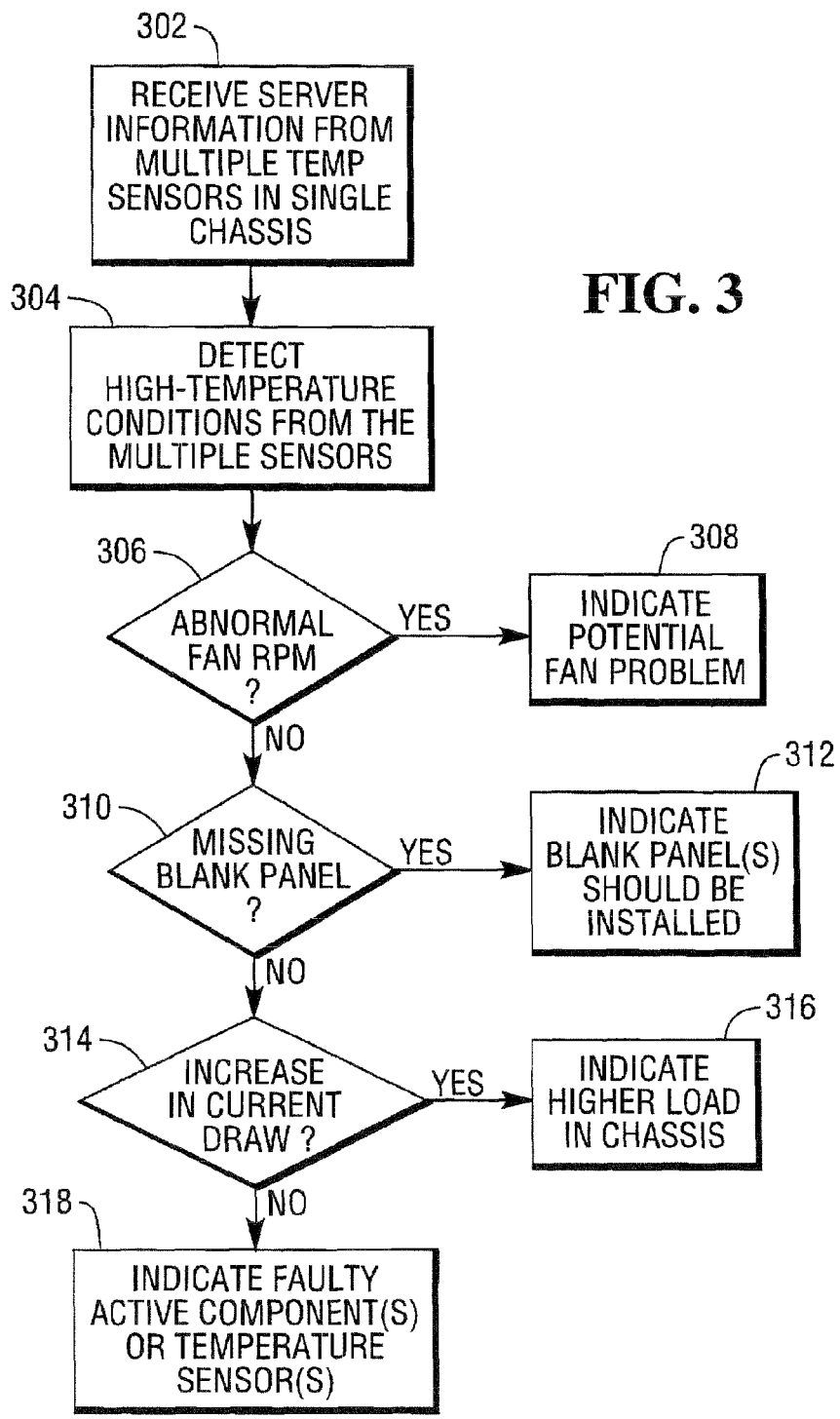

FIG. 3 illustrates a process according to an embodiment in which high-temperature readings by multiple sensors in a single chassis are processed. The controller 128 receives (at 302) sensor information from the multiple sensors in a single chassis. The controller detects (at 304) that the multiple sensors are indicating high temperatures in different parts of the chassis.

In response to such detection, the controller determines (at 306) whether there is an abnormal fan RPM condition. If so, then the controller indicates (at 308) a potential problem with one or more fans.

However, if there is no abnormal fan RPM condition, the controller determines (at 310) whether there are any missing blank panels. If so, the controller provides an indication (at 312) that blank panel(s) should be installed.

If there are no missing blank panels, then the controller determines (at 314) if there is an increase in electrical current or power consumption draw in the chassis. If so, then the controller outputs (at 316) an indication of a higher load in that chassis. An operator can then perform troubleshooting regarding why there is a higher load in the chassis, and can effect any necessary remedial action.

If there is no increase in current or power draw, then the controller indicates (at 318) that there may be bad active component(s) or temperature sensor(s) in the chassis.

Figure 4:
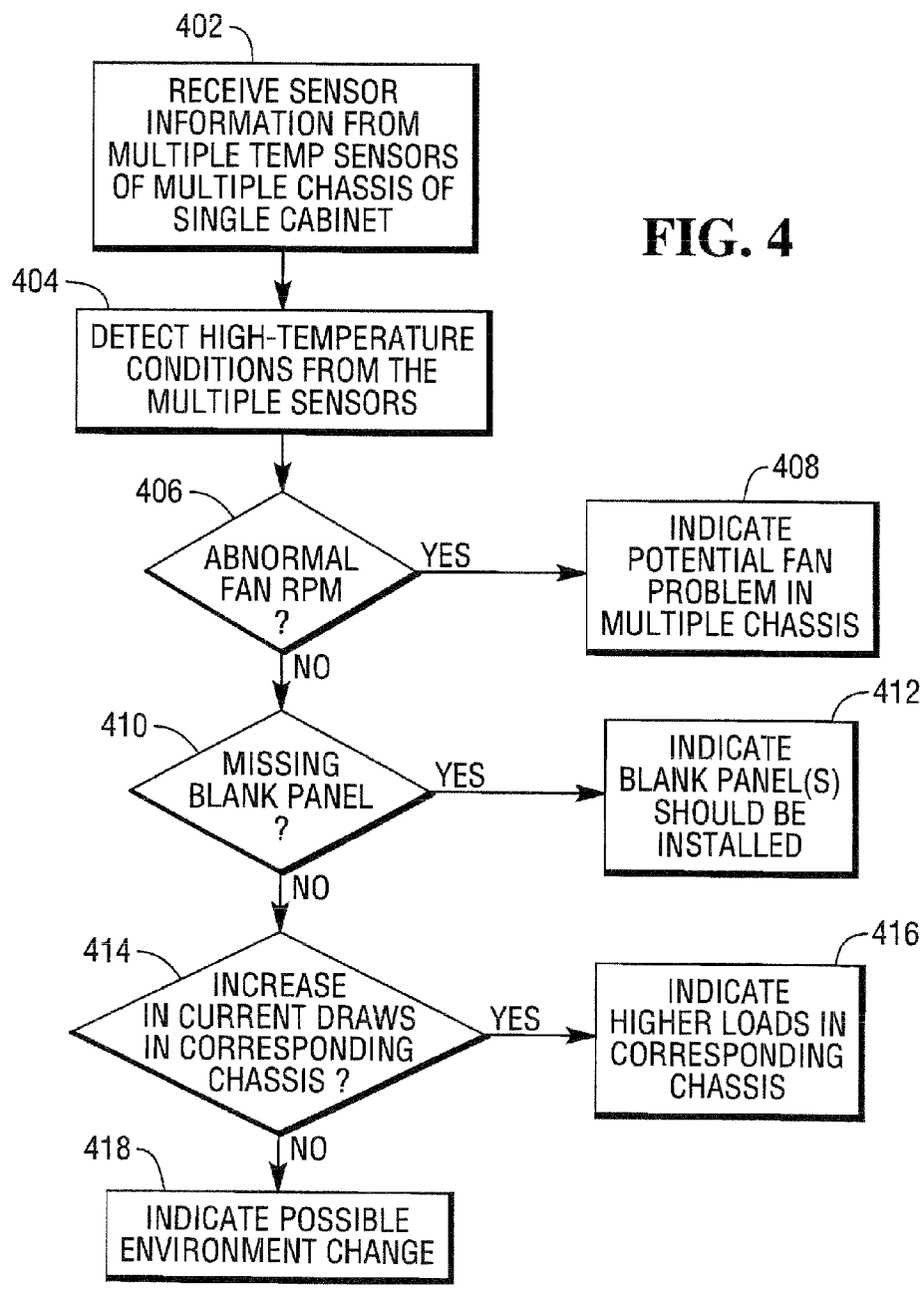

FIG. 4 is a flow diagram of a process according to another embodiment in which high-temperature readings from multiple temperature sensors in multiple chassis of a single cabinet are processed. The controller receives (at 402) sensor information from the multiple sensors in multiple chassis of the single cabinet. The controller detects (at 404), based on the received sensor information, high-temperature conditions in the multiple chassis of the single cabinet.

In response to such detection, the controller determines (at 406) whether there is an abnormal fan RPM. If so, the controller indicates (at 408) that fans in the multiple chassis of the single cabinet may be experiencing problems. The operator can then monitor, repair, and/or replace the fan(s).

If the determination at 406 indicates that there is no abnormal fan RPM, then the controller determines (at 410) whether there are any missing blank panels, based on information from one or more blank-panel detectors. If any blank panels are missing, then the controller outputs (at 412) an indication to install one or more blank panels.

If the determination at 410 indicates that there are no missing blank panels, then the controller determines (at 414) whether there are increases in current or power draws in corresponding chassis based on information from the current sensors 124. If there are increases in current draws (an increase of greater than some threshold, for example), then the controller indicates (at 416) that there is a higher load in the corresponding chassis of the system 100. The operator can then identify causes of the higher loads in the corresponding chassis and perform remedial actions accordingly.

If there is not an increase in current draw, as determined at 414, then the controller indicates (at 418) that there may be an environmental condition change around the cabinet. Note that it is unlikely that multiple active components or multiple fans or multiple sensors of multiple chassis can all be experiencing problems at the same time. Therefore, the likely cause for the high-temperature conditions in different chassis of the cabinet, in the absence of abnormal fan RPM, missing blank panels, or increases in current draws, is that the environment around the cabinet has changed (e.g., the room that the cabinet is located in may have a high temperature, such as when air conditioning is faulty).

Figure 5:
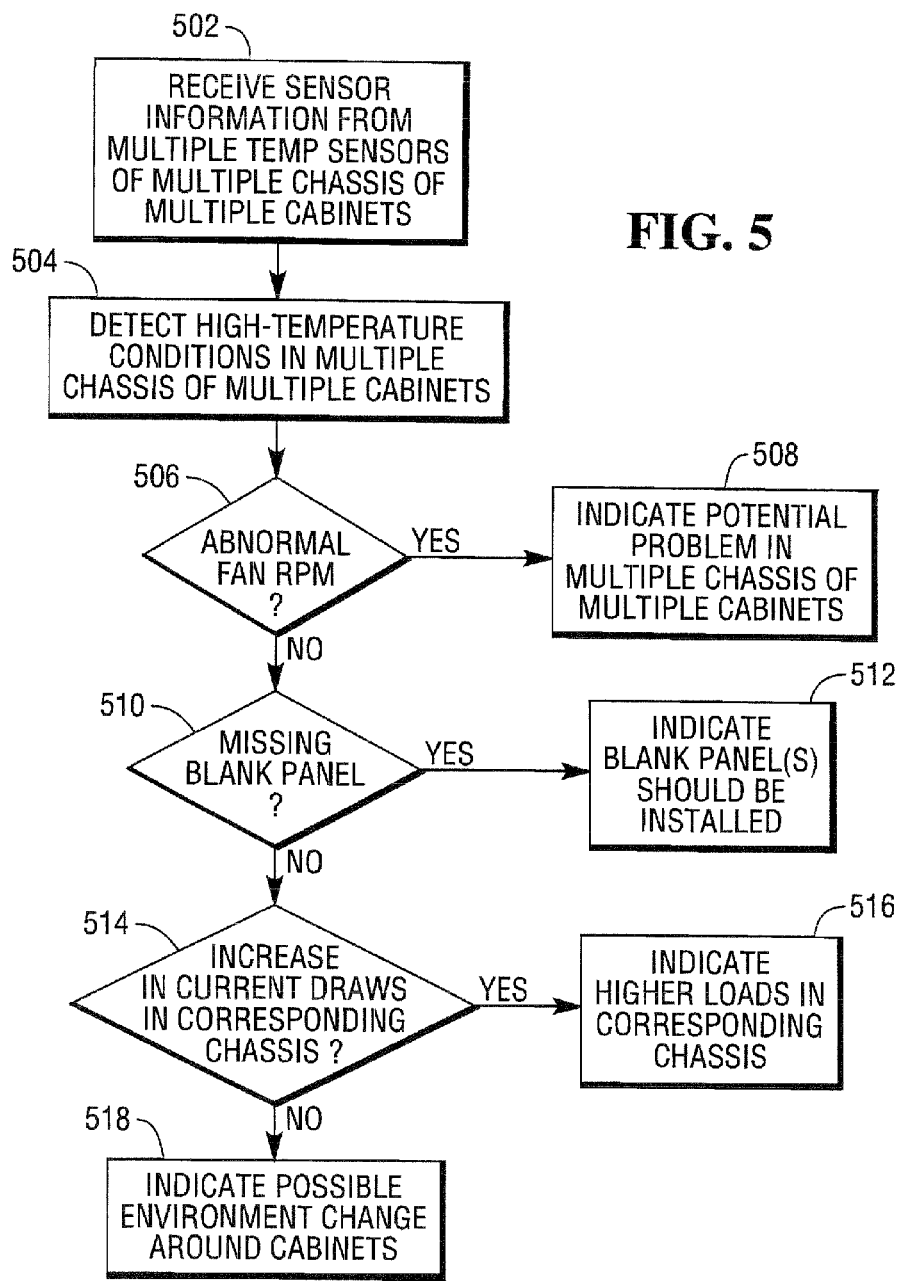

FIG. 5 is a flow diagram of another process according to an embodiment in which high-temperature readings from multiple sensors in multiple chassis of multiple cabinets are processed. The controller receives (at 502) sensor information from multiple sensors of multiple chassis of multiple cabinets. The controller detects (at 504) based on the received sensor information that there are high-temperature conditions in multiple chassis in multiple cabinets. In response, the controller determines (at 506) whether there is abnormal RPM conditions in these multiple chassis. If so, then the controller outputs (at 508) an indication that those fans in the multiple chassis of multiple cabinets can be faulty.

If there is no abnormal fan RPM conditions, then the controller determines (at 510) whether there are missing blank panels, again in those chassis. If so, the controller outputs (at 512) an indication that blank panels should be installed.

If there are no missing blank panels, the controller determines (at 514) whether there are increases in current draws in the multiple chassis of the multiple cabinets. If so, then the controller outputs (at 516) an indication that a higher load is present in the chassis in which there are increases in current draw.

If there is no increase in current draws, then the controller outputs (at 518) an indication that the environment condition around the cabinets may have changed.

The example diagnostic flows above illustrate how a controller can use multiple different measure parameters to make a more informed and accurate determination of causes of abnormalities in a system. The diagnostic flows illustrate that different scenarios may occur, involving different potential problems identified by different sensors.

Figure 6:
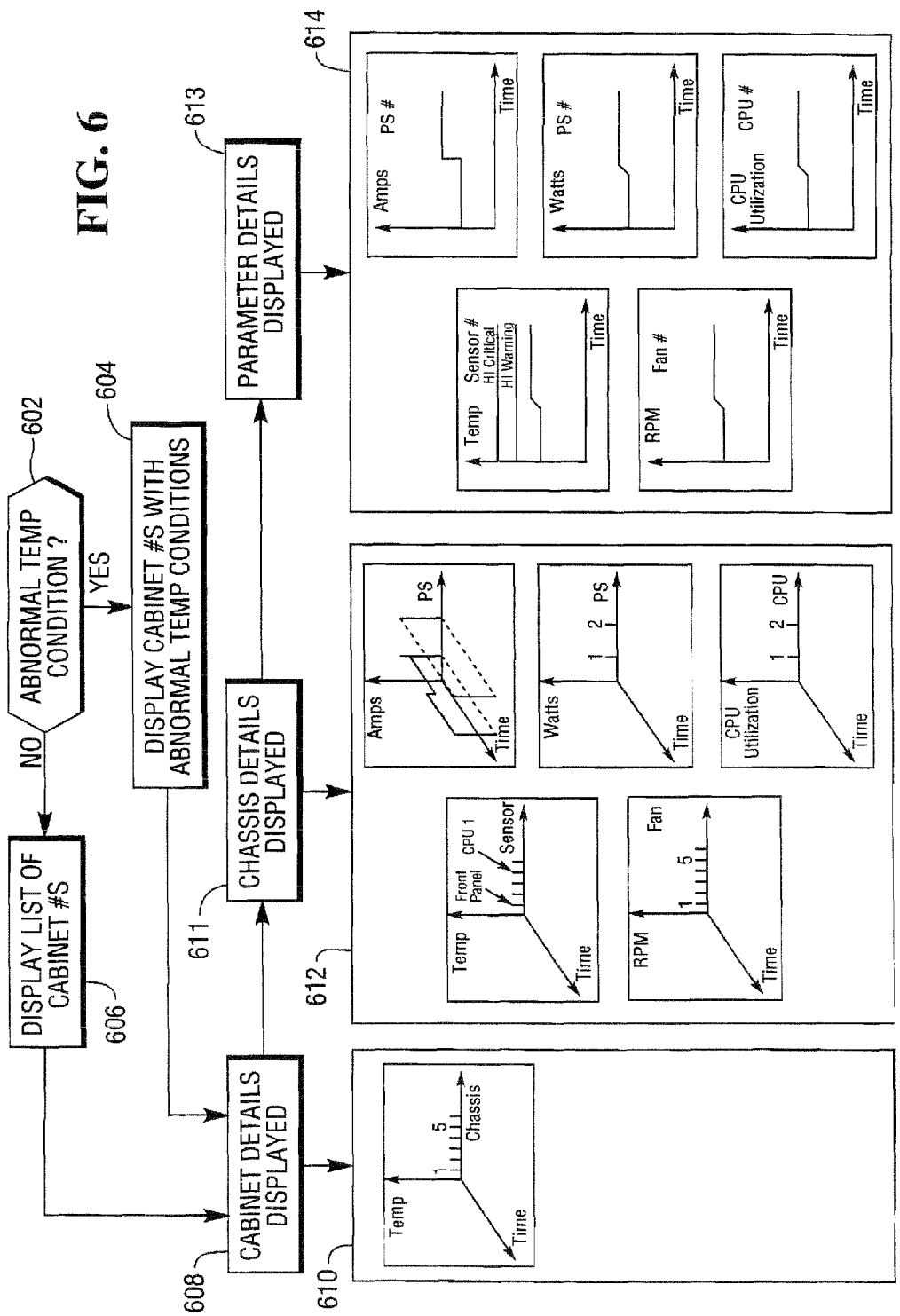
FIG. 6 illustrates a display process for displaying system information, according to an embodiment.

In accordance with some embodiments, the controller is able to present a display of one or more parts of the system. A display process is illustrated in FIG. 6.

The controller determines (at 602) whether the system is experiencing an abnormal temperature condition. If there is an abnormal temperature condition, the controller can cause display (at 604) of information relating to cabinets with the abnormal temperature conditions (e.g., identifiers of the cabinets or icons representing the cabinets). A user can click on one or more of the displayed cabinet identifiers (or icons) to view details of such one or more cabinets.

If no abnormal temperature condition is present, the controller can display (at 606) a full list of cabinets, from which user selection can be made to view further details regarding one or more of the cabinets.

In response to a user selection at 604 or 606, cabinet details are displayed (at 608), such as in a graphical user interface (GUI). A first visualization box 610 in FIG. 6 contains a graph (three-dimensional graph illustrating data relating temperature, time, and chassis) for the selected cabinet. The graph in visualization box 610 allows a user to quickly view the temperature in different chassis of the selected cabinet at different times.

The visualization box 610 can include interactive features selectable by a user. For example, the user can click on any part of the graph in the visualization box 610 to zoom into further details regarding the corresponding chassis. Alternatively, the visualization box 610 can include other identifiers or icons representing chassis from which a user can select.

In response to user selection of a particular chassis, chassis details are displayed (at 611) in a second visualization box 612, in which various graphs for different components (temperature sensors, fans, CPUs, current sensors, etc.) of the selected chassis are displayed.

A user can in turn select one or more of the components depicted in the visualization box 612 to view further detailed parameters of such component(s). In response to such selection, the further parameter details are displayed (at 613) in a visualization box 614.

FIG. 7 shows an example controller 128, which can include processing software 702 executable on one or more central processing units (CPUs) 704. The CPU(s) is (are) connected to a storage 706, which can store sensor information 708 from various sensors of the system 100 (FIG. 1A), and abnormality indications 710 that are output by the software 702 (e.g., output indications of FIGS. 2-5) for certain period of time. The stored historical data can be used at later dates to aid failure analysis. For example, when there is an increase in failure rates in hardware components in one cabinet, stored historical operating conditions monitored by these sensors can be used in an attempt to relate failures with operating conditions.

The software 702 is also able to produce output for display in a display device 712, which may be part of the controller 128 or may be remotely located from the controller 128. The display device 712 can display the various information depicted in the example of FIG. 6, for example.

Instructions of the software 702 can be loaded for execution on a processor (such as CPUs 704). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of determining a system condition, comprising:

receiving, by a processor, temperature information from at least one temperature sensor in a system and second information from at least a second type of sensor in the system, wherein the second type of sensor is of a type different from the temperature sensor;

detecting, by the processor, an out-of-range temperature condition according to the received temperature information; and according to the second information, selecting, by the processor, one of plural potential causes of the out-of-range temperature condition.

2. The method of claim 1, further comprising outputting an indication of the selected potential cause.

3. The method of claim 1, further comprising displaying representations of portions of the system experiencing out-of-range temperature conditions in a graphical user interface.

4. The method of claim 1, further comprising:
receiving third information from a third type of sensor in the system, wherein the third type of sensor is of a type different from the second type of sensor and different from the temperature sensor,
wherein selecting the one of the plural potential causes is further according to the third information.

5. The method of claim 4, wherein receiving the second information comprises receiving airflow generator information.

6. The method of claim 5, wherein receiving the airflow generator information comprises receiving fan rotational speed information.

7. The method of claim 5, wherein receiving the third information comprises receiving electrical current or power draw information.

8. The method of claim 5, wherein receiving the third information comprises receiving information regarding whether a blank panel is missing.

9. The method of claim 1, further comprising:
displaying details of the system in an interactive graphical user interface to receive user selection of details of different parts of the system to view.

10. The method of claim 9, further comprising:
receiving user selection in the interactive graphical user interface; and
presenting additional details of the system in response to the user selection of the interactive graphical user interface.

11. The method of claim 1, further comprising:
receiving temperature information from plural temperature sensors of plural chassis in a cabinet;
detecting out-of-range temperature conditions in the plural chassis; and
indicating a potential environment change around the cabinet in response to the second information indicating that a faulty condition is not present inside the cabinet.

12. The method of claim 1, further comprising:
receiving temperature information from plural temperature sensors of plural chassis in plural cabinets;
detecting out-of-range temperature conditions in the plural chassis of the plural cabinets; and
indicating a potential environment change around the cabinets in response to the second information indicating that a faulty condition is not present inside the cabinets.

13. A system comprising:
a temperature sensor;
a second sensor of a different type from the temperature sensor; and
a controller to:
detect, based on temperature information from the temperature sensor, an abnormal temperature condition;
identify, in response to first information from the second sensor, a first cause of the abnormal temperature condition; and
identify, in response to second information from the second sensor, a second cause of the abnormal temperature condition.

14. The system of claim 13, wherein the second sensor comprises a fan RPM sensor.

15. The system of claim 13, wherein the second sensor comprises an electrical current sensor.

16. The system of claim 13, wherein the second sensor comprises a blank panel detector to detect that a blank panel of the system is missing.

17. The system of claim 13, wherein the second sensor comprises an airflow generator sensor, the system further comprising:
at least another temperature sensor; and
a third sensor according to another type different from the temperature sensors and the second sensor, wherein the controller is configured to further:
detect abnormal temperature conditions in plural parts of the system in response to temperature information from the temperature sensors,
use information from the second sensor and third sensor to select from among different potential causes of the abnormal temperature conditions in the different parts of the system.

18. The system of claim 13, further comprising:
a display device to display an interactive graphical user interface,
wherein the controller is configured to receive user selection in the interactive graphical user interface to view further details regarding a part of the system experiencing the abnormal temperature condition.

19. An article comprising at least one non-transitory computer-readable storage medium containing instructions that when executed cause a system to:
receive temperature information from at least one temperature sensor in a system and second information from at least a second type of sensor in the system, wherein the second type of sensor is selected from the group consisting of: (1) a sensor to measure electrical current draw or power draw in the system, and (2) a sensor to detect whether a panel in the system is missing;
detect an out-of-range temperature condition according to the received temperature information; and
according to the second information, select one of plural potential causes of the out-of-range temperature condition.

20. The article of claim 19, wherein the instructions when executed cause the system to further:
receive third information from a third type of sensor in the system,
wherein selecting the one of the plural potential causes is further according to the third information.

* * * * *